United States Patent
Lajda

(10) Patent No.: US 9,932,935 B2
(45) Date of Patent: Apr. 3, 2018

(54) IGNITION SYSTEM

(71) Applicant: PRUEFREX ENGINEERING E MOTION GMBH & CO KG, Cadolzburg (DE)

(72) Inventor: Marek Lajda, Fuerth (DE)

(73) Assignee: PRUEFREX engineering e motion gmbh & co. kg, Cadolzburg (DE)

( * ) Notice: Subject to any disclaimer, the term of this patent is extended or adjusted under 35 U.S.C. 154(b) by 282 days.

(21) Appl. No.: 14/639,299

(22) Filed: Mar. 5, 2015

(65) Prior Publication Data
US 2015/0252754 A1    Sep. 10, 2015

(30) Foreign Application Priority Data
Mar. 5, 2014   (DE) .................. 10 2014 003 297

(51) Int. Cl.
| | |
|---|---|
| *F02D 41/06* | (2006.01) |
| *F02M 1/02* | (2006.01) |
| *F02P 5/152* | (2006.01) |
| *F02P 5/155* | (2006.01) |
| *F02P 5/06* | (2006.01) |

(Continued)

(52) U.S. Cl.
CPC .............. *F02M 1/02* (2013.01); *F02D 31/001* (2013.01); *F02P 1/02* (2013.01); *F02P 1/086* (2013.01); *F02P 5/06* (2013.01); *F02P 5/1506* (2013.01); *F02P 5/1521* (2013.01); *F02P 5/1555* (2013.01); *F02P 5/1556* (2013.01); *F02P 11/00* (2013.01); *F02P 11/02* (2013.01); *F02B 63/02* (2013.01); *F02D 41/2422* (2013.01);

(Continued)

(58) Field of Classification Search
CPC .. F02D 2200/1012; F02D 31/001; F02P 5/06; F02P 5/1506; F02P 5/1521; F02P 5/1555; F02P 5/1556; F02P 11/00; F02P 11/02; F02M 1/02
USPC ............. 123/406.54, 406.24, 406.53, 406.23
See application file for complete search history.

(56) References Cited

U.S. PATENT DOCUMENTS 4,259,934 A * 4/1981 Leussink ................. F02P 5/155
                                                      123/406.59
4,367,711 A * 1/1983 Ikeura ................... F02P 5/1506
                                                      123/406.55

(Continued)

FOREIGN PATENT DOCUMENTS

| DE | 10 2007 031 396 A1 | 1/2009 |
|---|---|---|
| DE | 10 2009 054 116 A1 | 9/2010 |

*Primary Examiner* — Mahmoud Gimie
*Assistant Examiner* — Josh Campbell
(74) *Attorney, Agent, or Firm* — Laurence A. Greenberg; Werner H. Stemer; Ralph E. Locher

(57) ABSTRACT

An ignition system of a combustion engine has a start-up adjustment curve with a maximum rotational speed, an operating adjustment curve and a switch-over device for switching between curves. The start-up adjustment curve is selected in the case of a start-up of the combustion engine. A rotational speed curve is divided into adjacent cycles. The start of the first cycle is the point in time of the second ignition after the start-up and the start of the subsequent cycles is in each case the point in time of ignition at which the rotational speed is less than in the case of the subsequent point in time of ignition. The criterion for switching to the operating adjustment curve is whether the average of the rotational speeds of successive cycles differs by less than a first tolerance value.

10 Claims, 5 Drawing Sheets

(51) Int. Cl.
  *F02P 11/02* (2006.01)
  *F02P 1/02* (2006.01)
  *F02P 1/08* (2006.01)
  *F02P 5/15* (2006.01)
  *F02P 11/00* (2006.01)
  *F02D 31/00* (2006.01)
  *F02B 63/02* (2006.01)
  *F02D 41/24* (2006.01)
  *F02N 3/02* (2006.01)

(52) U.S. Cl.
  CPC .. *F02D 2200/1012* (2013.01); *F02D 2400/06* (2013.01); *F02N 3/02* (2013.01); *Y02T 10/46* (2013.01)

(56) References Cited

U.S. PATENT DOCUMENTS

| | | | | |
|---|---|---|---|---|
| 4,378,770 A * | 4/1983 | Ikeura | ............... | F02P 5/1506 123/406.53 |
| 4,957,091 A * | 9/1990 | Remmers | ............ | F02P 5/1504 123/406.57 |
| 5,038,743 A * | 8/1991 | Remmers | ............ | F02P 5/1504 123/406.57 |
| 5,040,519 A * | 8/1991 | Remmers | ............ | F02P 5/1504 123/406.57 |
| 5,050,553 A * | 9/1991 | Erhard | ................. | F02P 1/086 123/406.54 |
| 7,198,028 B2 * | 4/2007 | Andersson | ........... | F02P 5/1504 123/339.11 |
| 7,894,974 B2 | 2/2011 | Baehner et al. | | |
| 8,469,001 B2 | 6/2013 | Yoshizaki et al. | | |
| 2003/0056755 A1 * | 3/2003 | Kiessling | .............. | F02D 37/02 123/406.24 |
| 2007/0181099 A1 | 8/2007 | Andersson et al. | | |
| 2008/0163851 A1 * | 7/2008 | Kolossow | ................ | F02N 3/02 123/406.54 |
| 2008/0223339 A1 * | 9/2008 | Carlsson | ................ | F02P 9/005 123/406.54 |
| 2009/0012699 A1 * | 1/2009 | Bahner | ............... | F02D 41/2422 701/105 |
| 2012/0297631 A1 * | 11/2012 | Kunert | .................. | F02P 5/1504 30/381 |

* cited by examiner

IGNITION SYSTEM

BACKGROUND OF THE INVENTION

Field of the Invention

The invention relates both to an ignition system of a combustion motor and also to a method for operating an ignition system.

Working devices, such as for example chain saws or lawn mowers are generally motor-driven. Insofar as these working devices are to be operated essentially in an autarkic manner or over a comparatively long period of time, a combustion motor is generally selected as the drive motor. The reason for this is that the fuel can be topped up comparatively rapidly and only comparatively robust tools are required. It is also possible to store working devices that are driven in this manner over a comparatively long period of time, whereas battery-operated electromotive working devices must take into account that the battery may possibly discharge. In order to reduce the manufacturing costs, the combustion motors comprise a carburetor. In order to ensure also that the combustion motor starts in comparatively low temperatures a so-called choke is also provided and prior to a start-up procedure fuel is introduced into the combustion chamber by means of said choke in order to compensate for condensation of fuel on the walls of the combustion chamber.

Generally, when actuating the choke, a throttle flap of the combustion motor is locked in a half-throttle position at which it is possible for a comparatively large volume of air-fuel mixture to flow into the combustion chamber. As a result, it is possible to start-up a comparatively cold combustion motor. In the event of a faulty operation of the choke and consequently the throttle flap locking arrangement is actuated in the case of a combustion motor that is already at operating temperature, a comparatively large volume of air-fuel mixture is supplied to the combustion chamber as a result of the locking arrangement of the throttle flap being in the half-throttle position. As a result, the combustion motor accelerates comparatively greatly. A tool by way of example of a chain saw that is coupled to the combustion motor is thus likewise accelerated and the operator could be injured.

A method for operating a working device having a combustion motor is known from DE 10 2009 054 116 A1. With reference to the time that is required to complete a single cycle, a decision is made as to whether a normal idling position or a first idling position is present. A single cycle is defined as being the time between the increase in the motor rotational speed up to the point where the motor rotational speed decreases. By way of example, eleven non-igniting processes are observed in the normal idling position and eight non-igniting processes are observed in the first idling position during the respective single cycle.

BRIEF SUMMARY OF THE INVENTION

The object of the invention is to provide a particularly suitable ignition system of a combustion motor, and a particularly suitable method for operating an ignition system in which in particular the risk of injury to an operator is reduced.

With respect to the ignition system, this object is achieved in accordance with the invention by virtue of the features as claimed and with respect to the method, this object is achieved in accordance with the invention as claimed.

Advantageous further developments and embodiments are the subject of the respective dependent claims.

The ignition system is used to operate a combustion motor that is in particular an integral part of a portable working device. The portable working device comprises in particular a tool that is driven by means of the combustion motor. By way of example, the tool is a rotating blade or similar and the portable working device is a lawn mower or a motorized scythe. Alternatively, the portable working device is a disc cutters, a chain saw or a hedge cutter, wherein the tool is adapted accordingly. The ignition system comprises a start-up adjustment curve and an operating adjustment curve. In other words, the start-up adjustment curve and the operating adjustment curve are stored in the ignition system. The time of an ignition, referred to hereinunder as point in time of ignition, is established with reference to the two adjustment curves. The start-up adjustment curve comprises a maximum rotational speed. As a result, it is only possible to operate the combustion motor at rotational speeds below the maximum rotational speed when the start-up adjustment curve is selected. For this purpose, the point in time of ignition by way of example is displaced with respect to the top dead center of the combustion motor by up to 180° or ignition does not occur if the rotational speed of the combustion motor is greater than the maximum rotational speed.

By way of example, the operating adjustment curve likewise comprises a limit rotational speed that is not exceeded during the operation of the combustion motor. The limit rotational speed is set in such a manner that an essentially safe operation of the combustion motor is possible below the limit rotational speed. By way of example, the combustion motor starts to deteriorate, by way of example as a result of vibrations or increased development of heat, when the combustion motor is operated above the limit rotational speed. In particular, the limit rotational speed is at least twice the maximum rotational speed of the start-up adjustment curve. In an expedient manner, the adjustment of the point in time of ignition with respect to the top dead center is comparatively small in the case of comparatively low rotational speeds, whereas in the case of comparatively high rotational speeds the adjustment is comparatively large. In particular, the value of the adjustment remains constant over a rotational speed band, wherein this rotational speed band is described as the idling rotational speed band. In an expedient manner, the maximum rotational speed is the highest possible value of the idling rotational speed band.

The start-up adjustment curve and the operating adjustment curve do not differ by way of example in the case of rotational speeds below the maximum rotational speed. In other words, in the case of rotational speeds below the maximum rotational speed of the start-up adjustment curve, the point in time of ignition when using the start-up adjustment curve is the same as when using the operating adjustment curve. Alternatively, at least in the case of specific rotational speeds, the point in time of ignition with respect to the top dead center of the combustion motor differs in dependence upon the adjustment curve being used.

Moreover, the ignition system comprises a switch-over device for switching between the start-up adjustment curve and the operating adjustment curve. In other words, it is rendered possible by means of the switch-over device to select either the start-up adjustment curve or the operating adjustment curve and thus to adapt the point in time of ignition of the combustion motor, also referred to as ignition, to suit prevailing requirements. In the case of a start-up procedure of the combustion motor, the start-up adjustment curve is selected by means of the switch-over device. As a consequence, it is only possible to operate the combustion motor at a maximum of the maximum rotational speed.

The rotational speed curve that occurs after the start-up of the combustion motor is divided into adjacent cycles at least after a specific point in time. In other words, each of the cycles moves into precisely a subsequent cycle, wherein no further region or time period is formed between said cycles. In other words, one cycle directly follows the respective preceding cycle. As soon as one of the cycles commences, the preceding cycles ends. As a result, none of the cycles run parallel to one another with respect to time. The start of the cycle is in each case the point in time of ignition at which the rotational speed is less than in the case of the point in time of ignition that directly follows on therefrom. The rotational speed decreases namely after an initial acceleration as a result of the first ignition of the respective cycle since as a result of the temperature of the combustion motor the combustion chamber does not contain any combustible mixture or sufficiently combustive mixture at the point in time of ignition. By way of example, said mixture is condensed on the walls or the combustion chamber or possible supply lines.

Insofar as the rotational speed of the combustion motor essentially continuously increases, the length of a cycle is the time required for one working cycle of the combustion motor. In the case of a two-stroke combustion motor, this is essentially the time required for one rotation of the crankshaft and in the case of a four-stroke motor the time required for two rotations of the crankshaft. Insofar as the rotational speed decreases after an acceleration of this type over two or rather over four rotations of the crankshaft and subsequently increases, the length of this cycle is equal to the duration between two points of time of ignition.

In an expedient manner, the first cycle commences with the second point in time of ignition after the start-up of the combustion motor. In other words, the second ignition after the start-up of the combustion motor is selected as the start of the cycle division, insofar as the rotational speed of the combustion motor differs from zero. In this manner, possible deviations within the first working stroke as a result of start-up difficulties are not taken into consideration.

The average rotational speed is determined within each cycle. In particular, all rotational speeds that are determined during the respective cycle are drawn upon for this purpose to form the average value. Alternatively, the respective average is formed from a number of specific rotational speeds. In an expedient manner, only those rotational speeds are drawn upon at which ignition occurs, in other words those rotational speeds that are achieved at the respective points in time of ignition. Insofar as the average of the rotational speeds of two successive cycles differs only by a first tolerance value, the operating adjustment curve is selected by means of the switch-over device. In other words, a switch-over from the start-up adjustment curve to the operating adjustment curve is performed. The tolerance value is by way of example equal to 500 RPM, 400 RPM, 200 RPM, 100 RPM or particularly preferred 300 RPM. As a result, the operating adjustment curve is selected if the average of the rotational speeds of successive cycles is greater or less than 300 RPM.

It is consequently rendered possible by means of suitably adapting the tolerance value to distinguish between an essentially stable smooth running of the combustion motor and an acceleration or deceleration of the combustion motor. Insofar as the combustion motor is running smoothly, the operating parameters of the combustion motor correspond to the desired parameters and the operating adjustment curve can be selected without any problem. In contrast, the limit of the rotational speed is increased to the maximum rotational speed of the start-up adjustment curve in the case of a switch-over from the start-up adjustment curve to the operating adjusting curve in the case of an acceleration of the combustion motor and this increase in the limit could lead to accidents occurring. As a result of averaging the rotational speed over the respective cycles, consideration is given to the prevailing environmental conditions of the combustion motor. Furthermore, the progression of the average of the rotational speed is essentially constant in this manner when the combustion motor is running smoothly and possible peaks at the start and end of the respective cycles are compensated for.

In an expedient manner, a switch-over to the operating adjustment curve is blocked, in other words the start-up adjustment curve is retained, if the rotational speed in the case of the second point in time of ignition of the first cycle, in other words in the case of the second ignition of the first cycle is less than in the case of the point in time of ignition that directly follows on therefrom. In other words, the blocking procedure is prevented if the rotational speed in the case of the fourth point in time of ignition after the start-up of the combustion motor is greater than the rotational speed in the case of the third point in time of ignition after the start-up of the combustion motor. As a result, the second cycle commences with the third point in time of ignition after the start-up of the combustion motor. The combustion motor is thus essentially continuously accelerated after its start-up. As a result of retaining the start-up adjustment curve, it is ensured that the rotational speed does not exceed the maximum rotational speed.

In an expedient manner, the operating adjustment curve is selected after a blocking of the switch-over procedure if the difference between the rotational speeds in the case of successive ignitions is negative. In other words, the operating adjustment curve is selected if after a switch-over has already been blocked as a result of the increasing rotational speed over the first three ignitions of the first cycle it is recognized that the rotational speed has decreased, in other words that the combustion motor has decelerated. In this manner, it is possible to operate the portable device in a proper manner as soon as the operating conditions of the combustion motor have changed. As a result of the rotational speed decreasing, it is assumed that the rotational speed also continues to decrease and in the case of a switch-over to the operating adjustment curve the maximum rotational speed is not exceeded. Consequently, it is possible despite an initially blocking of the switch-over procedure in the case of changed operating conditions to operate the combustion motor with the operating adjustment curve without having to first re-start the combustion motor.

In a particularly preferred embodiment of the invention, after a blocking of the switch-over procedure the ratio between ignitions at which the rotational speed increases and the number of ignitions at which the rotational speed decreases is determined per cycle. In other words, a check is performed in the case of each point in time of ignition of a cycle as to whether in the case of the respective preceding point in time of ignition of the same cycle the rotational speed of the combustion motor is greater or less than at the prevailing point in time of ignition. The two numbers of two adjacent cycles are determined and set in relationship with one another. As a result, the ratio of the numbers of points in time of ignition at which the rotational speed increases in comparison to the average number of points in time of ignition at which the rotational speed decreases is determined. Insofar as this determined ratio is less than a limit ratio, the operating adjustment curve is selected after a blocking of the switch-over procedure. In other words, the number of ignitions at which the rotational speed increases is less in the case of a switch-over than the corresponding number in the case of a limit ratio. The limit ratio is expediently 1:1 or 1:2. As a result, a switch-over procedure is performed insofar as over two successive cycles the number of ignitions at which the rotational speed decreases is greater than the number of ignitions at which the rotational speed increases. As a result, in the case of this criterion being fulfilled, the combustion motor no longer essentially continuously accelerates, so that it is possible and safe to override the maximum rotational speed and consequently also switch to the operating adjustment curve.

In an expedient manner, the procedure of switching from the start-up adjustment curve to the operating adjustment curve is in particular also still blocked if the average of the rotational speeds per cycle is greater than the maximum rotational speed of the start-up adjustment curve with respect to the first tolerance value. By way of example, a blocking of the switch-over procedure cannot be cancelled as long as this condition is fulfilled. As a result, the start-up adjustment curve is retained if the rotational speed of the adjustment motor corresponds essentially to the start-up adjustment curve. Consequently, it is prevented that in the case of a switch-over from the start-up adjustment curve to the operating adjustment curve the rotational speed of the combustion motor increases which could lead to the operator being injured or to the combustion motor being damaged. The first tolerance value is in particular 300 RPM or suitably selected in such a manner that in the case of a stable idling of the combustion motor the average of the rotational speed of successive cycles differs at a maximum by the first tolerance value. As soon as the condition is no longer fulfilled, in other words the average of the rotational speeds is less than the maximum rotational speed minus the first tolerance value, either the operating adjustment curve is selected or possible other criteria are checked that lead to the operating adjustment curve being selected.

After a blocking of the switch-over procedure, the operating adjustment curve is selected if the difference between the averages of the rotational speed of successive cycles is less than a limit value, in other words the average of the rotational speeds is decreasing. In other words, the difference between successive averages of the rotational speed is greater than the limit value, wherein subsequent averages are less than the preceding averages. The limit value is expediently greater than the first tolerance value and in particular greater than 500 RPM. As a consequence, a decrease in the rotational speed of the combustion motor is determined in this manner essentially accurately and consequently it is correctly ascertained that a switch-over to the operating adjustment curve would not lead to the maximum rotational speed of the start-up adjustment curve being exceeded.

By way of example, the start-up adjustment curve comprises an idling rotational speed and in particular likewise the operating adjustment curve, wherein the two idling rotational speeds are expediently identical. The idling rotational speed describes the rotational speed of the combustion motor that said combustion motor assumes if an essentially minimum supply of fuel and/or air is present. Insofar as the average of the rotational speeds of the cycles differs from the idling rotational speed by less than a second tolerance value, the operating adjustment curve is expediently selected. As a result, the operating adjustment curve is selected if it has been identified that the combustion motor is idling in essentially stable manner, and as a result it is possible to exclude that the combustion motor accelerates beyond the maximum rotational speed of the start-up adjustment curve. By way of example, the second tolerance value is equal to the first tolerance value and/or equal to 300 RPM or 500 RPM.

The combustion motor comprises for example a clutch that is embodied in particular as a centrifugal clutch. The clutch consequently transmits the torque only when the clutch rotational speed is greater than a specific clutch rotational speed. For this purpose, by way of example claws of the centrifugal clutch grip into corresponding receiving devices, wherein the claws are moved into the engagement position as a result of a prevailing centrifugal force. The claws only pivot when the clutch rotational speed is greater than a specific clutch rotational speed. By way of example, the claws are secured by means of a spring to prevent pivoting, wherein the resilient rate is adapted according to the corresponding clutch rotational speed. The clutch rotational speed is expediently greater than the maximum rotational speed of the start-up adjustment curve. By way of example, the clutch rotational speed is greater than or equal to the maximum rotational speed with respect to a third tolerance value, by way of example 500 RPM or 1,000 RPM. In this manner, torque cannot be transmitted if the start-up adjustment curve is selected. As a result, in the case of a start-up of the combustion engine, the torque that is delivered is not initially transmitted until it is established that in the case of a switch-over to the operating adjustment curve torque is likewise not transmitted unless it is the wish of the operator. The portable working device comprises in an expedient manner a tool, by way of example a guided saw chain or a rotating blade that is connected by means of the clutch to the combustion motor.

By way of example, the combustion motor is a single-cylinder combustion motor that operates in an expedient manner according to the two-stroke method. In this manner, it is rendered possible to manufacture the combustion motor in a comparatively cost-effective manner. By way of example, the combustion motor comprises a starter cable by means of which a start-up is performed manually. In other words, the combustion motor does not comprise an electrical starter and this reduces the manufacturing costs and the weight. In an expedient manner, the combustion motor comprises a carburetor by means of which an air-fuel mixture is provided. In this manner, on the one hand the manufacturing costs are reduces and on the other hand the robustness is increased.

In a particularly preferred embodiment of the invention, the combustion motor comprises a throttle flap locking arrangement. A throttle flap is locked in a half-throttle position by means of the throttle flap locking arrangement if a throttle grip or similar of the combustion motor is not operated. If the throttle flap locking arrangement has not been activated, the throttle flap is located in an essentially closed position. It is easier to start-up the combustion motor by means of the throttle flap locking arrangement since a comparatively large volume of air-fuel mixture is supplied to the combustion chamber. In particular, the throttle flap locking arrangement is activated by means of a choke being operated and released in the case of a throttle grip or similar being actuated. As a result of blocking the switch-over to the operating adjustment curve, it is not possible to switch to the operating adjustment curve and thus to override the maximum rotational speed if the throttle flap locking arrangement is activated.

The method for operating an ignition system of a combustion motor, said ignition system comprising a start-up adjustment curve and an operating adjustment curve, provides that the start-up adjustment curve is selected in the case of a start-up of the combustion motor. As a consequence, a spark plug or similar of the combustion motor that is in particular an integral part of a portable working device is influenced in accordance with what is determined by means of the start-up adjustment curve. After the start-up of the combustion motor, the rotational speed of said combustion motor is ascertained at specific times or essentially continuously and a rotational speed curve is created based thereon. In particular, the rotational speed is only ascertained at the point in time of the respective ignition, in other words at the points in time of ignition. In a further working step, a check is performed as to whether the rotational speed of the combustion engine increases continuously within a first number of points in time of ignition. The first number is in this case in particular between 2 and 5, expediently equal to 3. Consequently, a check is performed as the first condition as to whether in the case of the first three ignitions the rotational speed is greater in each case than in the case of the respective preceding ignition. Insofar as this is the case, it is not possible to switch from the start-up adjustment curve to the operating adjustment curve and consequently the ignition is controlled according to the start-up adjustment curve. In particular, the rotational speed of the combustion motor is kept below a maximum rotational speed. This occurs in particular as a result of failures to spark failures or by means of a displacement of the point in time of ignition by up to 180° before the top dead center of the combustion motor.

If the first condition is negative, in other words the rotational speed does not increase over the first number of points in time of ignition of the combustion motor, a check is performed as the second condition as to whether the rotational speed continuously decreases within a second number of points in time of ignition of the combustion motor. The determination process either follows on from the first number of points in time of ignition or a check is performed within the first number of points in time of ignition as to whether the rotational speed decreases over the second number of points in time of ignition. In particular, the second number is equal to 2, 3 or 4. In the event that the rotational speed decreases over the second number of points in time of ignition, the operating adjustment curve is selected. The operating adjustment curve is selected comparatively rapidly by means of a procedure of this type in the case of a negative first condition and a positive second condition, and the combustion motor can be taken into use comparatively rapidly. In contrast, in the case of a positive first condition, it is ensured comparatively early that the start-up adjustment curve is retained and the operating adjustment curve is not selected, said operating adjustment curve differing from the start-up adjustment curve in particular by means of the limitation of the rotational speed in the case of a specific value, in particular in the case of a maximum rotational speed.

In an expedient manner, the ascertained rotational speed curve of the combustion motor is divided into adjacent cycles. In other words, there is no separate time period between successive cycles but rather the respective cycles are directly adjacent to one another; neither do different cycles run parallel to one another with respect to time. On the contrary, the end of one of the cycles forms the start of the respective subsequent cycle. The start of each cycle is the point in time of ignition at which the rotational speed is less than in the case of the subsequent point in time of ignition. As a result, each cycle commences with the increase in the rotational speed. If in the case of the subsequent point in time of ignition, in other words in the case of the second point in time of ignition after the point in time of ignition that starts the cycle, the rotational speed is greater than in the case of the first point in time of ignition after the start of the cycle, the first cycle ends already at the first point in time of ignition after its start and the further cycle commenced at the same place. If on the other hand the rotational speed decreases in the case of this point in time of ignition, then the cycle does not end until in the case of the point in time of ignition, in the case of its subsequent point in time of ignition, the rotational speed increases. In an expedient manner, the second point in time of ignition of the combustion motor is selected as the start of the first cycle after the combustion motor is started up.

In the event that the second condition is negative and as a result likewise the first condition is negative, the number per cycle of successive points in time of ignition at which the rotational speed increases and the number of points in time of ignition at which the rotational speed decreases is determined. In a further working step, the two numbers are formed over two successive cycles and set in relationship with one another. As a third condition, a check is performed as to whether the ratio formed in this manner is less than a limit ratio. The limit ratio is by way of example 1:1, and in the case of a ratio of by way of example 1:2 the third condition is positive. In other words, in the case of a positive third condition, the number of points in time of ignition at which the rotational speed decreases is greater than the number of ignitions at which the rotational speed increases.

If the third condition is negative, a switch-over to the operating adjustment curve is blocked and the start-up adjustment curve is retained for controlling the ignition element of the combustion motor. In contrast thereto, the operating adjustment curve is selected if the third condition is positive. In this manner, the number of comparatively effective ignitions per cycle, in other words ignitions at which the rotational speed increases, in comparison to ineffective ignitions is determined, wherein in the case where the combustion motor is idling smoothly the number of ineffective ignitions outweighs the number of comparatively effective ignitions or the ratio is at least less than the limit ratio. Consequently, the operating adjustment curve is only used for controlling the ignition element in the case where the combustion motor is idling in a comparatively smooth manner, whereas in the case where a combustion motor is running in a comparatively erratic manner the start-up adjustment curve is retained, which on the one hand in particular maintains the rotational speed below a maximum value and on the other hand expediently controls the ignition element in such a manner that the combustion motor is prevented from stopping unintentionally.

Alternatively thereto or in combination therewith, the blocking of the switch-over is cancelled and a switch-over is performed from the start-up adjustment curve to the operating adjustment curve if the difference between the averages of the rotational speeds of successive cycles, in particular two successive cycles, is less than a limit value, wherein the limit value is for example negative. The average of the rotational speeds of successive cycles is less than that of the respective preceding average. In other words, the average of the rotational speeds continuously decreases over the successive cycles, wherein the decrease is always greater than the limit value. The limit value is by way of example −300 RPM to −1,000 RPM and expediently equal to −500 RPM.

In an expedient manner, it is determined as the fourth condition whether the average of the rotational speeds of successive cycles differs by less than a first tolerance value. The check as to whether the fourth condition is present is performed by way of example in parallel to checking the presence of the second condition and/or in parallel timewise to determining the third condition insofar as a determination procedure of this type is provided.

To summarize, the ignition system of a combustion motor comprises an operating adjustment curve and a start-up adjustment curve, in particular a maximum rotational speed. After the start-up of the combustion motor, the start-up adjustment curve is selected and the rotational speed curve of the combustion motor is ascertained. A check is performed as to whether the first condition is present and/or whether the average of the rotational speeds of successive cycles differs by less than a first tolerance value.

BRIEF DESCRIPTION OF THE SEVERAL VIEWS OF THE DRAWING

One embodiment of the invention is explained in detail hereinunder with reference to a drawing, in which.

Parts that correspond with one another are provided with like reference numerals in all the figures.

DESCRIPTION OF THE INVENTION

Figure 1:
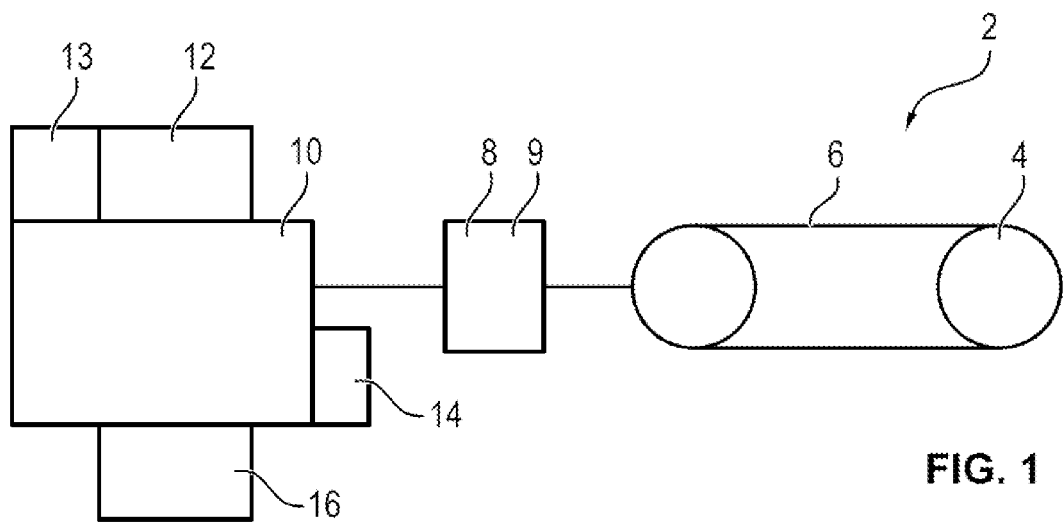
FIG. 1 illustrates schematically a portable working device with a combustion motor that comprises an ignition system.

FIG. 1 is a schematic simplified illustration of a portable working device 2 in the form of a chain saw. The chain saw 2 comprises a tool 4 having a saw chain 6 that is coupled to a centrifugal clutch 8. The centrifugal clutch 8 has a clutch rotational speed 9 (FIG. 5) of 4,500 RPM. Consequently, the saw chain 6 is only driven if on the input side the centrifugal clutch has a rotational speed n (FIG. 6 and FIG. 7) that is greater than or equal to 4,500 U/min. The centrifugal clutch 8 is coupled on the input side to a single cylinder combustion motor 10 that operates in accordance with the two stroke method. The combustion motor 10 comprises a throttle flap having a throttle flap locking arrangement 12. In the case of the throttle flap locking arrangement 12 being activated, the throttle flap is held in a half-throttle position by means of the throttle flap locking arrangement 12 in order to feed into a combustion chamber of the combustion motor 10 a comparatively large amount of air-fuel mixture that is created by means of a carburetor 13. Moreover, the combustion motor 10 comprises a manually operated starter cable 14 by means of which a crank shaft, not illustrated in detail, of the combustion engine 10 is set in motion. Moreover, the combustion motor 10 comprises an ignition system 16 (FIG. 4).

Figure 2:
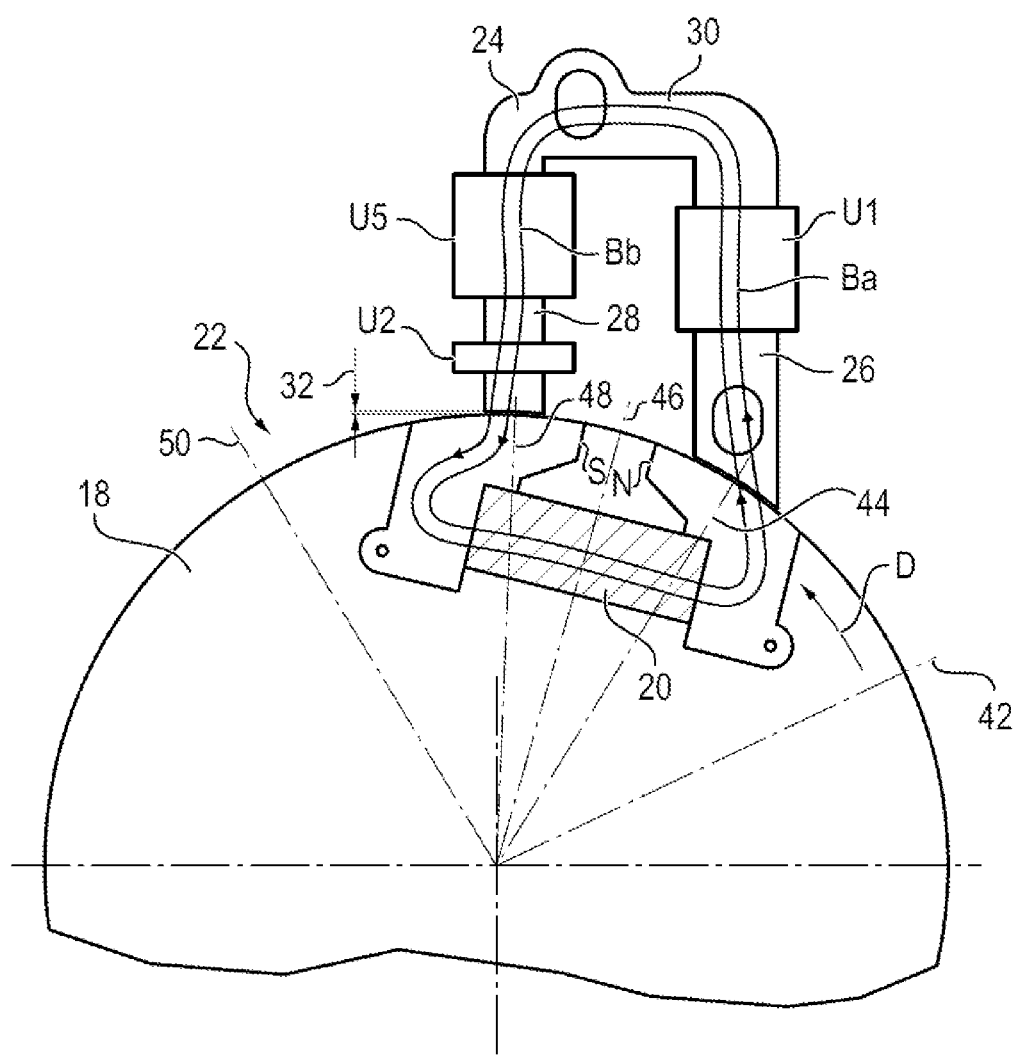
FIG. 2 illustrates an axial plan view of a magnetic generator of the ignition system.

In accordance with FIG. 2, a pole wheel 18 is arranged and coupled to a crankshaft [not illustrated] of the combustion motor 10 in such a way that the pole wheel 18 rotates in a synchronous manner with the crankshaft of the combustion motor. A permanent magnet 20 is structurally integrated in the peripheral region of the pole wheel 18 in order to attach magnetically conductive pole shoes S, N around the pole regions of said pole wheel. The mentioned parts 18, 20, S, N form together a magnetic generator 22 that is rotated by the crankshaft by way of example in a direction of rotation D in an anti-clockwise manner. The magnetic poles or rather pole shoes S (south pole), N (north pole) are moved in their mentioned sequence past a soft iron magnetic yoke core 24 in each case initially past the first limb 26 of said yoke core and subsequently past the second limb 28 of said yoke core. The two limbs 26, 28 are mutually connected by way of a middle part 30 of the yoke core 24 forming a U-shape. A respective magnetic flux Ba or Bb flows periodically through an air gap 32 in the yoke core 24 or rather its limbs 26, 28 during a rotational movement in the direction D. The limb 26 through which said magnetic flux flows first in the direction of rotation D is encompassed by a charging coil U1, wherein a voltage is induced as a result of the changes in the direction of flow of the magnetic flux that occur during the rotation process.

Figure 4:
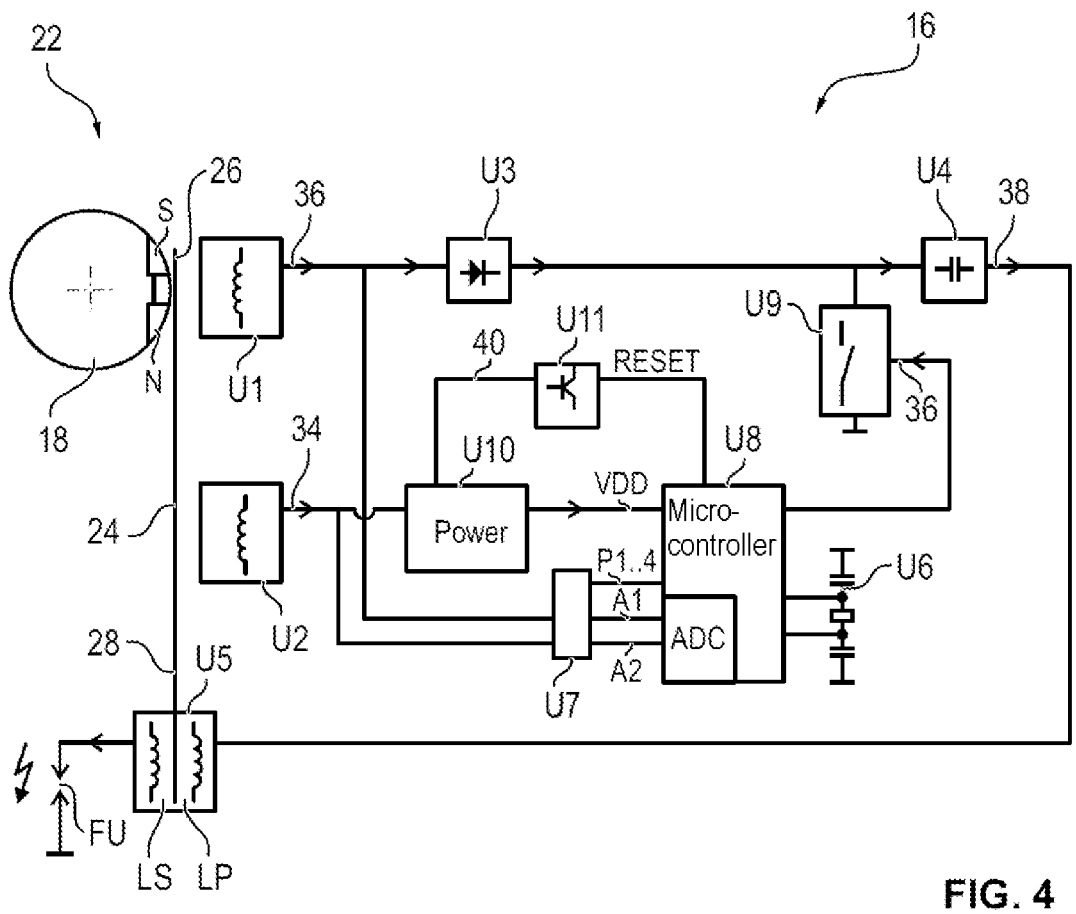
FIG. 4 illustrates a schematic block diagram for the ignition system in accordance with the invention.

In accordance with FIG. 4, an energy storage element U4 in the form of an ignition capacitor of the ignition system 16 is charged with this charge voltage by way of a rectifier U3. An ignition switch U9 that is connected to the input of the energy storage element U4 and can be connected to ground is controlled in a specific angular position, (point in time of ignition) by a trigger switch or rather controller U8, wherein the energy storage element U4 discharges by way of the primary coil Lp of an ignition transformer U5. The latter is arranged in accordance with FIG. 2 with its primary coil Lp and its secondary coil Ls about the yoke core limb 28 that occurs in the direction of rotation D as the second limb. Likewise, a voltage supply coil U2 surrounds the second yoke core limb 28 in the end region thereof that is adjacent to the air gap 32. In accordance with FIG. 4, the output 34 of the voltage supply coil U2 is connected to a voltage supply unit U10 that generates the operating voltage VDD for the controller U8, by way of example a programmable microcontroller. Furthermore, the controller U8 of the ignition system 16 is designed so that said controller requires only a small magnitude of energy from the coil U2. For this purpose, the charging coil U2 is wound with the thin wire of the secondary winding Ls of the ignition transformer U5, and it is possible in this manner to achieve advantages with respect to the manufacturing process and storage requirements.

In accordance with FIG. 4, the controller U8 is provided internally with an analogue-digital converter ADC having at least the two analogue signal sensing inputs A1, A2. A signal level attenuation circuit U7 is connected upstream of said signal sensing inputs and can be adjusted by means of said signal sensing inputs via port connections P1 . . . P4 of the controller U8 and adapted to respective signal strengths of the coils. The attenuation circuit U7 is connected at the input side to the output 36 of the charging coil U1 and parallel to the output 34 of the voltage supply coil U2 in order to feed these signals, attenuated depending upon the conditions at the port connections P1 . . . P4, to the signal sensing inputs A1, A2 of the controller U8. It is possible with the aid of a clock pulse generator U6 that is connected externally to the controller U8 to form internally in the controller U8 a clock or time counter that in combination with the analogue-digital converter ADC with reference to the alternating current half-waves, which are ascertained by way of the attenuation circuit U7, from the charging coil U1 and the voltage supply coil U2 to measure the respective duration of different angular sections. The ignition switch U9 is subsequently actuated at the determined point in time of ignition Zzp by way of the control output 36 of the controller U8 in dependence upon the evaluation of the duration of the ascertained angular sections. The discharge side 38 of the ignition capacitor U4 is connected directly to the primary coil Lp of the ignition transformer U5 that encompasses the second yoke core limb 28. The secondary coil Ls that is designed so as to transform the voltage to a higher voltage and likewise encompasses the second yoke core limb 28 is connected to said primary coil Lp, the output of said secondary coil leading to the ignition spark gap FU.

Furthermore, in accordance with FIG. 4, the ignition module is provided with a reset circuit U11 and the input side 40 of said reset circuit U11 is supplied with energy from the voltage supply unit U10. The reset circuit U11 is connected on the output side to the RESET input of the controller U8.

Figure 3:
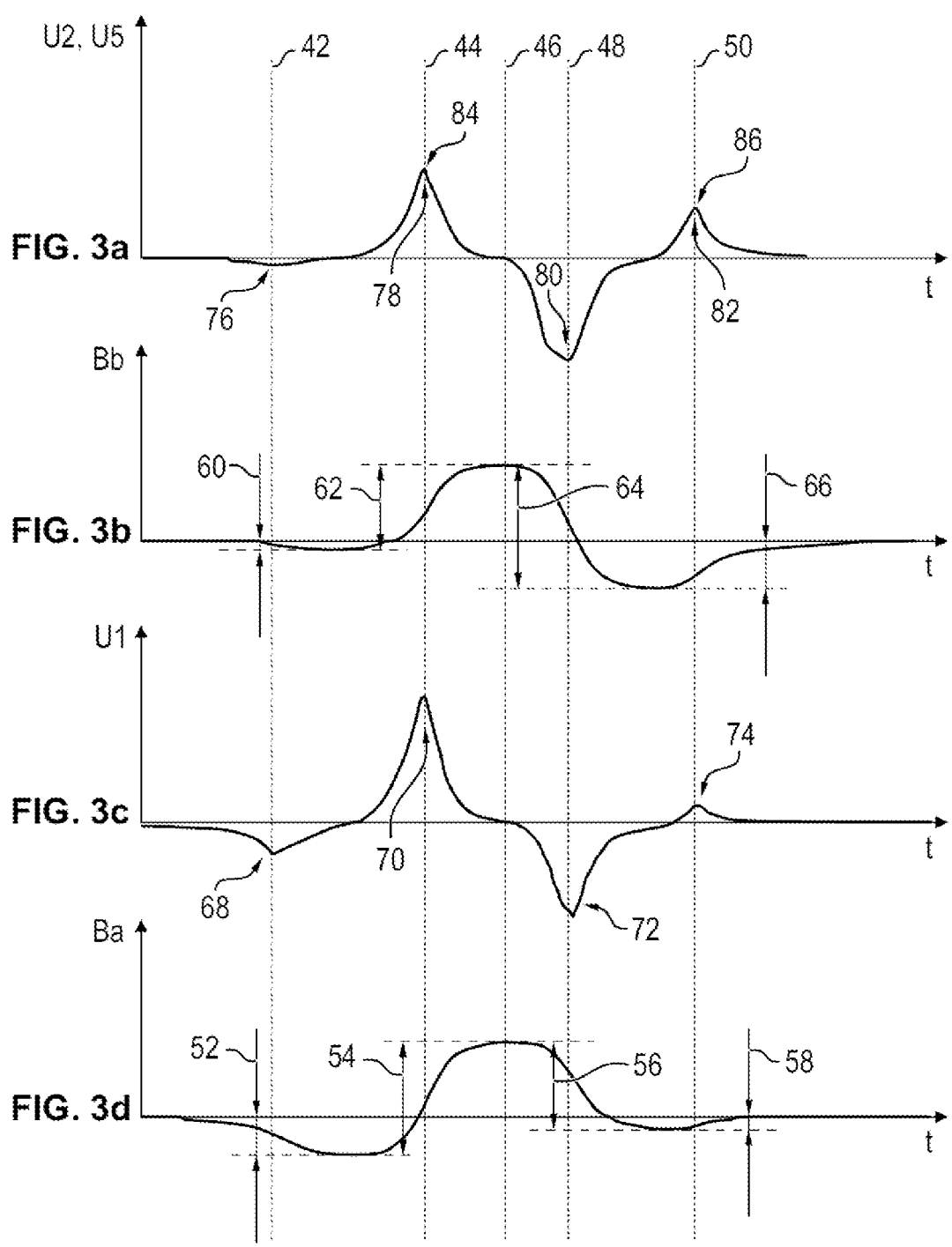
FIGS. 3a-3d illustrate the progressions with respect to time of the voltages prevailing in the coils of the magnetic generator and magnetic fluxes with respect to one another in respective different scalings in the respective same time section and time scale.

FIG. 2 illustrates the radial lines of symmetry in different rotational positions 42, 44, 46, 48, 50 for the magnetic generator 22. These correspond to the magnetic flux changes 52, 54, 56, 58 in FIG. 3d and also 60, 62, 64, 66 in FIG. 3b and to the alternating current half-waves 68, 70, 42, 74 in FIGS. 3c and 76, 78, 80, 82 in FIG. 3a, wherein the illustrated time graphs for the magnetic fluxes Ba, Bb for the individual limbs and the coil voltages U1, U2 or U5 respectively are plotted in the same time scale and same time periods with respect to one another according to their respective synchronized occurrence. The voltages on the Y-axis are illustrated with different scalings depending upon the different number of coil windings. The occurrence of the rotational positions 42-50 are likewise indicated in FIGS. 3a to 3d in order to further clarify the physical relationships. As is also evident from FIG. 3a, the voltage supply unit U10 is first supplied within one rotation or half-wave sequence with energy from the positive alternating current half-wave 78 with a peak voltage 84 so that the controller U8 can function from around 60 degrees before the top dead center TDC. The motor angular velocity is still relatively high and the angular velocity only falls drastically the closer it gets to the top dead center TDC (cf. peak voltage 86). In order for the controller U8 to function with the lowest possible energy consumption from the voltage supply unit U10, said controller is only available when a RESET signal is triggered from around the middle of the second charging voltage half-wave 70 in accordance with FIG. 3c (cf. also dotted vertical line in FIGS. 3a-3d) up to the respective calculated point in time of ignition Zzp (FIG. 6, FIG. 7), in particular in the lowest rotational speed range, in other words during the motor start-up. After the corresponding dotted vertical line 44 that in the FIGS. 3a-d passes through the respective time axes, the controller can ascertain the voltage half-waves from the charging coil U1 and the voltage supply coil U2 depending upon the signal by way of the attenuation circuit and process or rather evaluate said result in order to calculate the point in time of ignition Zzp. The currents that still flow by way of the attenuation circuit U10 can be ignored with respect to the energy consumption due to the high internal resistances.

The energy storage element U4 is expediently re-charged at the end of a half-wave cycle 68-70-72-74 from the charging coil U1 with the last half-wave 74 and subsequently further charged in the next half-wave cycle with the strongest half-wave of the charging coil U1 for the next point in time of ignition Zzp.

In order to capture and process the coil signals, it is also possible to use, in addition to the analogue-digital converter ADC that is integrated into the controller U8 in accordance with FIG. 4, a microcontroller having a comparator and programmable comparison voltage. The second-mentioned variant is favorable for combustion motors that have a high rotational speed because it is possible to recognize more rapidly for further processing that predetermined threshold voltages have been achieved or exceeded. Microcontrollers of this type are marketed nowadays by different semiconductor manufacturers. Together with the concept of sensing alternating current half-waves and detecting and measuring their rising or falling flanks, it is also possible in conjunction with microcontrollers of this type in the start-up rotational speed range and idling rotational speed range to recognize the direction of rotation and this is advantageous for low rotational speeds, within an angular region from the peak voltage 84 of the second positive half-wave in accordance with FIG. 3a up to the point in time of ignition.

With each initialization in the region of the peak voltages 84, 86 of the voltage supply coil U2, the internal clock of the controller U8 is started and from the respective point in time of initialization 84, 86 said clock continuously counts internal pulses with constant intervals of e.g. a microsecond, said pulses being emitted by the clock pulse generator. In combination therewith, respective time stamps are stored for events that occur at the signal sensing inputs A1, A2 (said events being by way of example a coil signal below or above a threshold value that is pre-programmed for the analogue-digital ADC in accordance with FIG. 4). By way of example, the respective points in time at which the pre-programmed, negative voltage thresholds are first exceeded can be evaluated relative to one another by means of signals from the charging coil U1 on the first yoke core limb 26 and by means of the signals of the voltage supply coil U2 on the second yoke core limb 28. It is possible in a data processing facility in the controller to convert the elapsed time into a value indicating the rotational speed of the combustion motor, said elapsed time being within a half-wave sequence from the peak voltage 84 of the second half-wave up to a non-achievement of a pre-programmed, negative voltage value (corresponding by way of example to an angular position of 45 degrees before the top dead center TDC). Further time stamps can be counted and stored in further angular positions and it is possible to ascertain therefrom the change in the angular velocity whilst moving closer to the top dead center.

Figure 5:
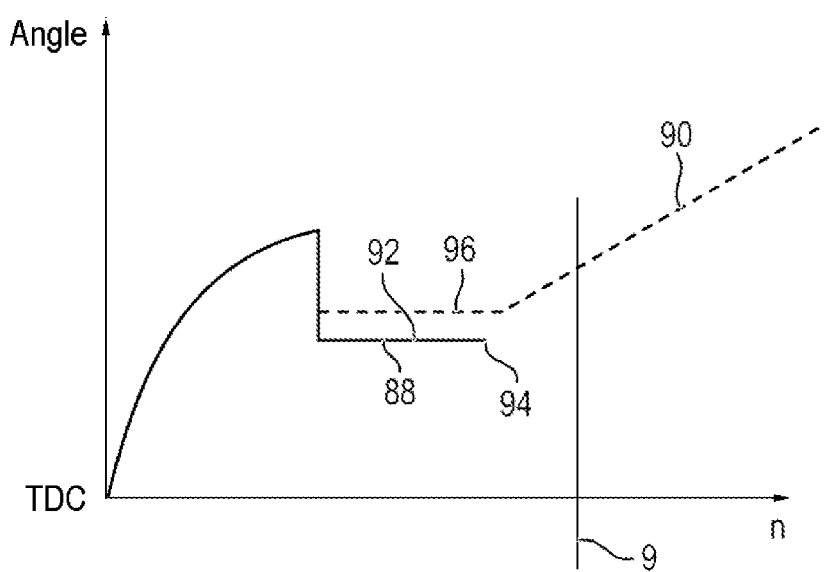
FIG. 5 illustrates a start-up adjustment curve and an operating adjustment curve that are stored in the ignition system.

FIG. 5 illustrates a start-up adjustment curve 88 and an operating adjustment curve 90 that are stored in the controller U8. The graph plots by how many degrees the point in time of ignition Zzp against the direction of rotation D lies before the top dead center TDC dependent upon the rotational speed n of the crankshaft of the combustion motor 10. In the case of low rotational speeds n, the angle is comparatively small and increases as the rotational speeds increase in order to achieve effective combustion within the combustion chamber of the combustion motor 10. In an idling section 92 of the start-up adjustment curve 88, the angle is constant over a rotational speed band up to a maximum rotational speed 94. In the idling section 92, the start-up adjustment curve 88 is displaced to a later point in time of ignition Zzp so that the combustion motor 10 does not accelerate too rapidly and thus has a smoother running behavior. If the rotational speed n should exceed the maximum rotational speed 94, then the air/fuel mixture that is located within the combustion chamber is not ignited and this leads to a drop in the rotational speed n. The maximum rotational speed 94 is less than the clutch rotational speed 9 of the centrifugal clutch 8. As a consequence, it is not possible to drive the tool 4 as long as the start-up adjustment curve 88 is selected.

The operating adjustment curve 90 likewise comprises an idling section 96, wherein this idling section 96 is displaced with respect to the idling section 92 of the start-up adjustment curve 88 against the direction of rotation D. Alternatively, the angle of the start-up adjustment curve 88 and of the operating adjustment curve 90 is equal in the case of their respective idling section 92, 96. Furthermore, the operating adjustment curve 90 also extends in the case of rotational speeds n that is greater than the maximum rotational speed. In other words, in the case of a rotational speed n that is greater than the maximum rotational speed 94, a point in time of ignition Zzp is set and the mixture that is located within the combustion chamber of the combustion motor 10 is ignited. In so doing, the angle with respect to the top dead center TDC against the direction of rotation D is increased as the rotational speed n increases so that a comparatively effective combustion occurs and thus it is possible to accelerate the rotational movement of the crankshaft insofar as it is desired.

Figure 6:
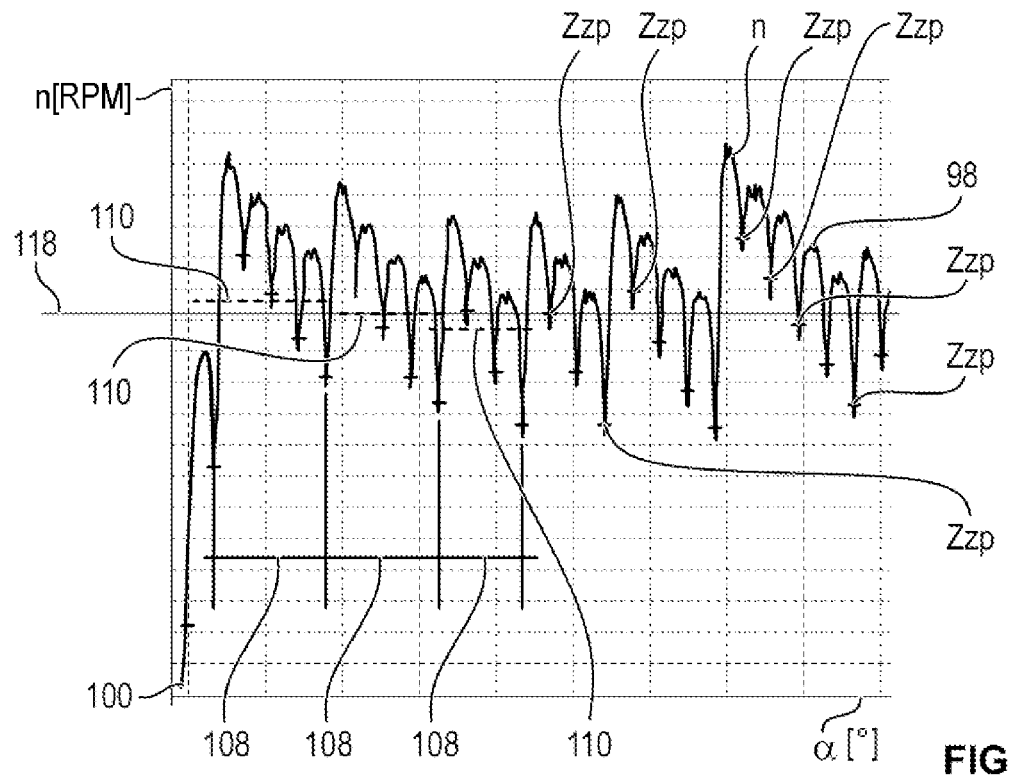
FIG. 6 illustrates a first rotational speed progression.
Figure 7:
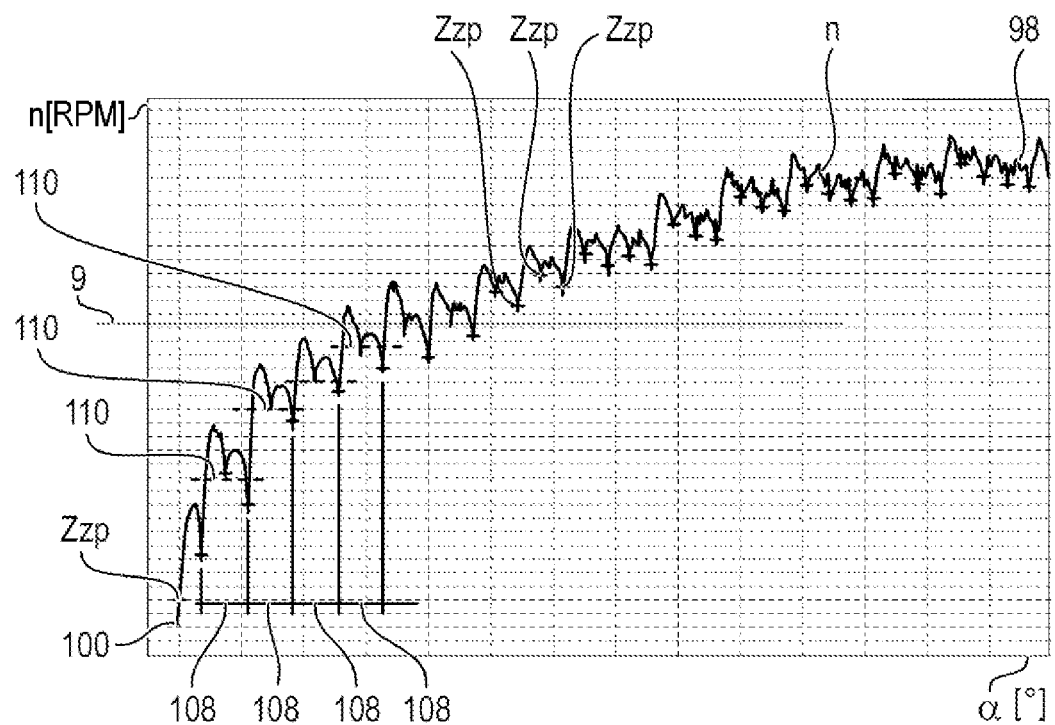
FIG. 7 illustrates a second rotational speed progression.

FIG. 6 illustrates a rotational speed curve 98 of the crankshaft and thus also of the pole wheel 18 of the combustion motor 10. The combustion motor 10 operating temperature and the throttle flap locking arrangement 12 is not activated. In other words, the throttle flap is located in the idling position. In contrast thereto, FIG. 7 illustrates the rotational speed curve 98 of the combustion motor 10 with the throttle flap locking arrangement 12 activated, wherein the operating adjustment curve 90 is selected at the start-up 100 of the combustion motor 10. The combustion motor 10 is initially cold and heats up comparatively rapidly, or the combustion motor 10 is already at an operationally warm temperature at the start-up 100. As is evident in FIG. 7, the rotational speed n exceeds the clutch rotational speed 9 comparatively rapidly after the start-up 100 and the tool 4 is driven as a result. In FIG. 6 and FIG. 7, the rotational speed n of the combustion motor 10 is plotted in RPM over the angle α in degrees about which the crankshaft is rotated since the start.

Figure 8:
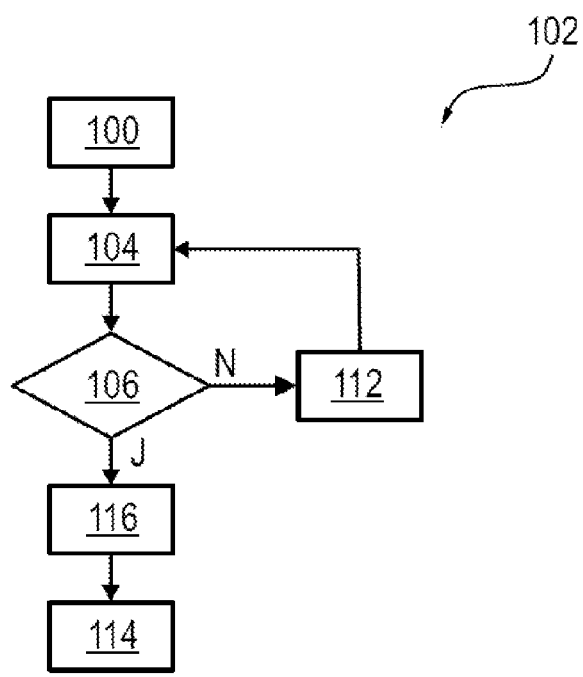
FIG. 8 illustrates a first method for operating the ignition system.

FIG. 8 illustrates schematically a flow chart of a method 102 for operating the ignition system 16 so that the rotational speed curve 98 illustrated in FIG. 7 does not occur due to the switch-over from the start-up adjustment curve 88 to the operating adjustment curve 90 being blocked. After the start-up 100 of the combustion motor by means of the starter cable 14, the start-up adjustment curve 88 is selected in a first selection step 104 and the respective points in time of ignition Zzp are set accordingly. In a first checking step 106, the rotational speed curve 98 is divided into adjacent cycles 108. The start of the first cycle 108 is the second point in time of ignition Zzp after the start-up 100 of the combustion motor 10. Each of the cycles ends at the point in time of ignition Zzp at which the rotational speed n is less than in the case of the directly following point in time of ignition Zzp. Within each of the cycles 108, the average 110 of the rotational speed n is formed during the cycle 108. In order to simplify the calculation, only the rotational speeds n at the individual points in time of ignition Zzp of the respective cycle 108 are drawn upon. If the difference between the averages 110 of successive cycles 108 is greater than a tolerance value of 300 RPM, as is the case by way of example in FIG. 7, then the switch-over from the start-up adjustment curve 88 to the operating adjustment curve 90 is blocked in a blocking step 112. As a result, the ignition system 16 continues to be operated with the start-up adjustment curve 88 and the first checking step 106 is repeated. Insofar as the averages 110 differ by less than 300 RPM, as illustrated in FIG. 6, the switch-over from the start-up adjustment curve 88 to the operating adjustment curve 90 occurs in a second selection step 114.

Furthermore, a check is performed in the first checking step 106 as to whether the rotational speed n in the case of the second point in time of ignition Zzp of the first cycle 108 is less than in the case of the directly following point in time of ignition Zzp. This is not the case both in the case of the rotational speed curve 98 illustrated in FIG. 6 and also in the case of the rotational speed curve 98 illustrated in FIG. 7. However, should this criterion be fulfilled, then the blocking step 112 is likewise performed.

If the blocking step 112 has been performed, and as a result a switch-over to the operating adjustment curve 90 is blocked, this blocking is cancelled in a cancellation step 116 if a condition for cancelling the blocking has been recognized in the repeated first checking step 106. A condition of this type is by way of example whether the difference between the averages 110 of successive cycles 108 is less than a limit value, in particular 500 RPM, wherein each of the averages 110 that contributes to determining this condition is less than the respective preceding average 110. A further condition is whether the average 110 differs by less than a second tolerance value from an idling rotational speed 118, wherein the idling rotational speed 118 is essentially the rotational speed n at which the crankshaft rotates if the throttle flap locking arrangement 12 is not activated. The idling rotational speed 118 is 2,500 RPM. The second tolerance value is expediently 300 RPM. A further condition leading to the blocking being cancelled is whether the difference between the rotational speeds n is negative in the case of two successive points in time of ignition Zzp insofar as the blocking is achieved due to the increase in the rotational speed n between the second point in time of ignition Zzp of the first cycle 108 and the successive point in time of ignition Zzp.

The cancellation step 116 is however not performed if the average of the rotational speeds 110 corresponds essentially to the maximum rotational speed 94 or differs from said maximum rotational speed by less than 300 RPM. As a consequence, by way of example in the case where the throttle flap locking arrangement 12 is activated, a switch-over to the operating adjustment curve 90 is not performed if it is to be assumed that the rotational speed n exceeds the maximum rotational speed 94 and the clutch rotational speed 9 essentially without delay after the switch-over has been performed.

A further condition that leads to performing the cancellation step 116 is whether the ratio between the numbers of successive ignitions Zzp at which the rotational speed n increases and the number of successive ignitions Zzp at which the rotational speed n decreases is less than a limit ratio. The respective number is determined over two successive cycles 108, and the limit ratio is 1:1. In the case of the rotational speed curve 98 illustrated in FIG. 6, the ratio is 1:3, wherein the first two cycles 108 are drawn upon to form the ratio. The rotational speed n in each case increases once and decreases over the three subsequent ignitions Zzp namely in each case after the ignition Zzp that starts the respect cycle 108. In the case of the rotational speed curve 98 illustrated in FIG. 7, the ratio is 1:1, wherein in turn the first two cycles 108 are drawn upon for determining purposes. As a result, in the case of the rotational speed curve 98 illustrated in FIG. 7 the switch-over procedure continues to be blocked.

Figure 9:
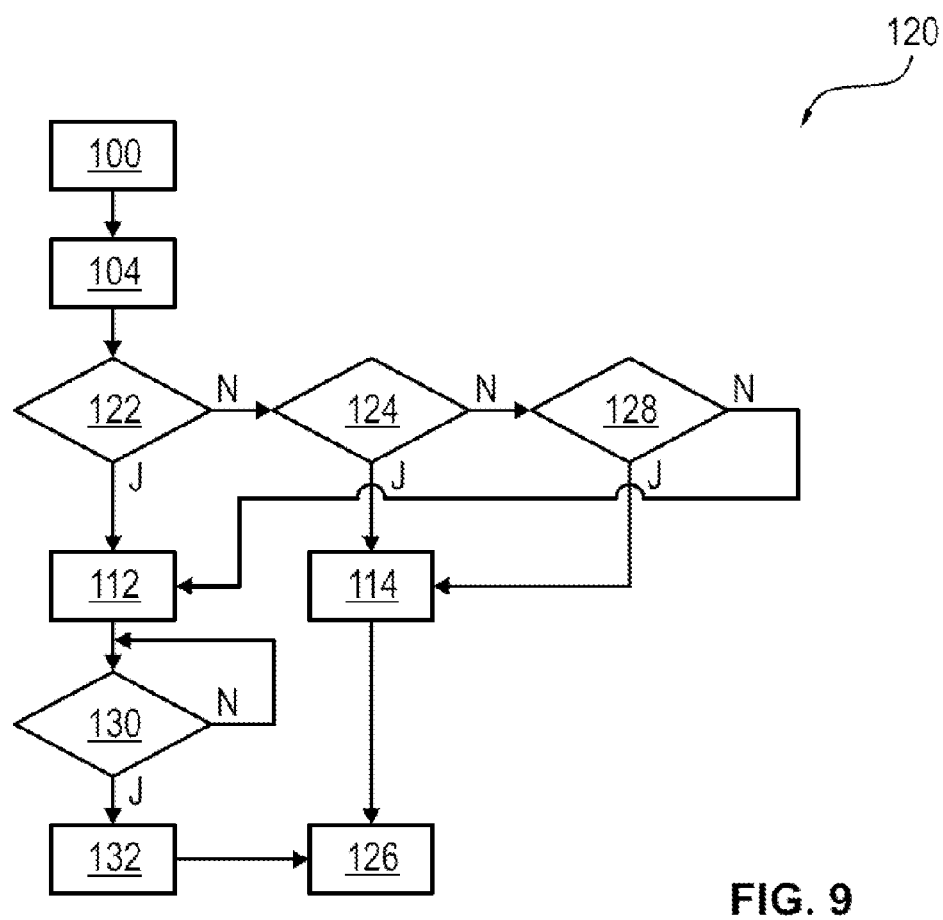
FIG. 9 illustrates a further method for operating the ignition system.

FIG. 9 illustrates a further method 120 for operating the ignition system 16. The first selection step 104 is also performed in this case after the start-up 100 of the combustion motor 10 and the ignition system 16 is operated with the start-up adjustment curve 88. The resultant rotational speed curve 98 is ascertained and a check is performed in a second checking step 122 as a first condition as to whether the rotational speed n continuously increases within the first three points of time of ignition Zzp that correspond to the first three rotations of the combustion motor 10. If this is the case, then the blocking step 112 is performed and as a result a switch-over from the start-up adjustment curve 88 to the operating adjustment curve 90 is prevented.

In the event that the first condition is negative, as is the case in the case of the two rotational speed curves 98 illustrated in FIG. 6 and FIG. 7, a check is performed in a third checking step 124 as to whether a second condition is fulfilled. The second condition is in this case whether the rotational speed continuously decreases over two points in time of ignition Zzp of the combustion motor 10. In other words, a check is performed as to whether three directly successive points in time of ignition Zzp exist, wherein the rotational speed n in the case of the point in time of the second ignition Zzp is less than in the case of the point in time of the first ignition Zzp and the rotational speed n in the case of the point in time of the third ignition Zzp is less than in the case of the point in time of the second ignition Zzp. This would be by way of example the case in the case of the rotational speed curve 98 illustrated in FIG. 6. In the case of the rotational speed curve 98 illustrated in FIG. 7, the second condition is however negative. In the event that the second condition is positive, the second selection step 114 is performed and the switch-over from the start-up adjustment curve 88 to the operating adjustment curve 90 is performed. There then follows normal operation 126 in which by way of example the tool 4 is operated and the working device 2 is used in a proper manner.

If the second condition is negative, a check is performed in a fourth checking step 128 as to whether a third condition is fulfilled. The third condition is whether the ratio between the average number of successive points in time of ignition Zzp at which the rotational speed n increases, and the average number of successive points in time of ignition Zzp at which the rotational speed n decreases of two successive cycles 108 is less than 1:1, as already explained in connection with the method 102 illustrated in FIG. 8. In the event that the third condition is positive, the second selection step 114 is performed, otherwise the blocking step 112 is performed.

In the event that the blocking step 112 is performed, a fifth checking step 130 is subsequently performed until a fourth condition is fulfilled. The fourth condition is whether the average 110 of the rotational speed n decreases within a cycle 108 over two adjacent cycles 108, in other words whether the subsequent average 110 is less than the preceding average 110. This occurs by way of example if the activation of the throttle flap locking arrangement 12 is cancelled and the throttle flap pivots as a result into the idling position. In the event that the fourth condition is fulfilled, a third selection step 132 is performed and a switch-over from the start-up adjustment curve 88 to the operating adjustment curve 90 is performed, followed by the normal operation 126.

The invention is not limited to the above described exemplary embodiments. On the contrary, other variants of the invention can also be derived therefrom by the person skilled in the art without departing from the subject matter of the invention. In particular, all the individual features that are described in connection with the individual exemplary embodiments can moreover also be combined in other ways with one another without departing from the subject matter of the invention.

LIST OF REFERENCE NUMERALS

2 Portable working device
4 Tool
6 Saw chain
8 Centrifugal clutch
9 Clutch rotational speed
10 Combustion motor
12 Throttle flap locking arrangement
13 Carburetor
14 Starter cable
16 Ignition system
18 Pole wheel
20 Permanent magnet
22 Magnetic generator
24 Yoke core
26 First limb
28 Second limb
30 Middle part
32 Air gap
34 Output
36 Output
38 Control output
40 Input side
42 Rotational position
44 Rotational position
46 Rotational position
48 Rotational position
50 Rotational position
52 Magnetic flux change
54 Magnetic flux change
56 Magnetic flux change
58 Magnetic flux change
60 Magnetic flux change
62 Magnetic flux change
64 Magnetic flux change
66 Magnetic flux change
68 Alternating current half-wave
70 Alternating current half-wave
72 Alternating current half-wave
74 Alternating current half-wave
76 Alternating current half-wave
78 Alternating current half-wave
80 Alternating current half-wave
82 Alternating current half-wave
84 Peak voltage
86 Peak voltage
88 Start-up adjustment curve
90 Operating adjustment curve
92 Idling section
94 Maximum rotational speed
96 Idling section
98 Rotational speed curve
100 Start-up 102 Method
104 First selection step
106 First checking step
108 Cycle
110 Average
112 Blocking step
114 Second selection step
116 Cancellation step
118 Idling rotational speed
120 Method
122 Second checking step
124 Third checking step
126 Normal operation
128 Fourth checking step
130 Fifth checking step
132 Third selection step
A1, A2 Signal sensing input
ADC Analogue-digital converter
Ba, Bb Magnetic flux
D Direction of rotation
FU Ignition spark gap
Lp Primary coil
Ls Secondary coil
n Rotational speed
TDC Top dead center
P1 . . . P4 Port connection
S, N Pole shoe
U1 Charging coil
U2 Voltage supply coil
U3 Rectifier
U4 Energy storage element
U5 Ignition transmitter
U6 Clock pulse generator
U7 Attenuation circuit
U8 Controller
U9 Ignition switch
U10 Voltage supply unit
U11 Reset switch
VDD Operating voltage
Zzp Point in time of ignition
α Angle

The invention claimed is:

1. An ignition system of a combustion engine, the ignition system comprising:
   a start-up adjustment curve including a maximum rotational speed, an operating adjustment curve, and a switch-over device for switching over between the start-up adjustment curve and the operating adjustment curve, and wherein:
   the start-up adjustment curve is selected on occasion of a start-up of the combustion engine;
   a rotational speed curve of the combustion engine is divided into adjacent cycles, including a first cycle and subsequent cycles;
   a start of the first cycle is a second point in time of ignition after the start-up of the combustion engine and a start of subsequent cycles is in each case a point in time of ignition at which the rotational speed is less than at a following point in time of ignition; and
   a criterion for switching over into the operating adjustment curve is whether a difference between the averages of the rotational speeds of successive cycles is less than a first tolerance value.

2. The ignition system according to claim 1, wherein the combustion engine is specifically configured for a portable working device.

3. The ignition system according to claim 1, wherein a switch-over process is blocked if the rotational speed in the case of the second point in time of ignition of the first cycle is less than at the immediately following point in time of ignition.

4. The ignition system according to claim 3, wherein, after a blocking of the switch-over process, the operating adjustment curve is selected if a difference between the rotational speeds is negative for two successive points in time of ignition.

5. The ignition system according to claim 1, wherein after a blocking of the switch-over procedure the operating adjustment curve is selected if a ratio between a number of successive points in time of ignition at which the rotational speed increases and a number of successive points in time of ignition at which the rotational speed decreases of two successive cycles is less than a limit ratio.

6. The ignition system according to claim 1, wherein a switch-over process is blocked if an average of the rotational speeds is greater than a maximum rotational speed of the start-up adjustment curve minus a first tolerance value.

7. The ignition system according to claim 1, wherein the operating adjustment curve is selected after a blocking of the switch-over process if a difference between the averages of the rotational speeds of successive cycles is less than a limit value and/or the average of the rotational speeds differs from an idling rotational speed by less than a second tolerance value.

8. A method of operating an ignition system of a combustion engine, the ignition system having a start-up adjustment curve defining a maximum rotational speed of the combustion engine and an operating adjustment curve, and the method comprises:
   selecting the start-up adjustment curve in case of a start-up of the combustion engine;
   ascertaining a rotational speed curve of the combustion engine after the start-up;
   as a first condition, performing a check, while the engine is operated using the start-up adjustment curve, as to whether the rotational speed continuously increases within a first number of points of time of ignition of the combustion engine;
   blocking a switch-over to the operating adjustment curve if the first condition is positive;
   only if the first condition is negative, as a second condition, performing a check as to whether the rotational speed continuously decreases within a second number of points in time of ignition of the combustion engine, and selecting the operating adjustment curve if the second condition is positive.

9. The method according to claim 8, wherein the method is configured for operating a portable working device.

10. The method according to claim 8, which comprises:
    dividing the rotational speed curve of the combustion engine into adjacent cycles;
    selecting the second point in time of ignition after the start-up as a start of the first cycle and in each case selecting a point in time of ignition as the start of subsequent cycles in which the rotational speed is less than in the case of the point in time of ignition that follows on therefrom;
    if the second condition is negative, establishing a third condition by performing a check as to whether a ratio between a number of successive points in time of ignition at which the rotational speed increases and a number of successive points in time of ignition at which the rotational speed decreases of two successive cycles is less than a limit ratio;

blocking a switch-over to the operating adjustment curve if the third condition is negative; and selecting the operating adjustment curve if the third condition is positive, and/or cancelling the blocking of the switch-over and selecting the operating adjustment curve if the difference between the averages of the rotational speeds of successive cycles is less than a limit value.

* * * * *